US006828967B1

(12) United States Patent
King et al.

(10) Patent No.: US 6,828,967 B1
(45) Date of Patent: Dec. 7, 2004

(54) METHOD OF AND APPARATUS FOR DIGITAL DATA STORAGE

(75) Inventors: Tony Richard King, Newnham (GB); David John Cole, Landbeach (GB)

(73) Assignee: Internet Pro Video Limited (GB)

( * ) Notice: Subject to any disclaimer, the term of this patent is extended or adjusted under 35 U.S.C. 154(b) by 485 days.

(21) Appl. No.: 09/787,230

(22) PCT Filed: Jul. 19, 2000

(86) PCT No.: PCT/GB00/02771

§ 371 (c)(1),
(2), (4) Date: Mar. 16, 2001

(87) PCT Pub. No.: WO01/06458

PCT Pub. Date: Jan. 25, 2001

(30) Foreign Application Priority Data

Jul. 20, 1999 (GB) .............................................. 9916819

(51) Int. Cl.[7] .............................................. G06T 15/00
(52) U.S. Cl. .................................................... 345/428
(58) Field of Search ............................. 707/102, 104.1; 711/117, 1; 341/51, 79; 709/104; 705/52; 382/167; 348/391.1; 345/419, 428, 619

(56) References Cited

U.S. PATENT DOCUMENTS

| 593,506 | A | | 11/1897 | Barrett ........................ 364/200 |
| 5,768,535 | A | | 6/1998 | Chaddha et al. ............. 382/232 |
| 5,880,856 | A | | 3/1999 | Ferriere .................. 358/426.11 |
| 6,567,081 | B1 | * | 5/2003 | Li et al. ....................... 345/419 |

OTHER PUBLICATIONS

"A Theory for Multiresolution Signal Decomposition: The Wavelet Representation" S. G. Mallat; IEEE Transactions on Pattern Analysis and machine Intelligence, vol. II, No. 7, Jul. 1989, pp. 674–693.
Very Low Bit–Rate Embedded Video Coding with 3D Set Partitioning in Hierarchical Trees (3D SPIHT) Beong–Jo Kim, et al., Nov. 4, 1997; pp. 1–32.
"Wavelet–based compression of medical images: Protocols to improve resolution and quality scalability and region–of–interest coding" P. Schelkens, et al., FGCS, pp. 171–184; (1999).
"A Compact Storage Scheme for Fast Wavelet–Based Sub-region Retrieval" A.S.Poulakidas, et al., Computing and Combinatorics. Annual Intern'l (1997) XP000884847 pp. 353–362.

* cited by examiner

Primary Examiner—Phu K. Nguyen
(74) Attorney, Agent, or Firm—Synnestvedt Lechner & Woodbridge, LLP; Richard C. Woodbridge, Esq.; Roy Rosser

(57) ABSTRACT

Digital data storage conventionally requires an election to be made between retaining data on-line, which consumes expensive media, or moving it to a far cheaper archive medium, which is relatively inaccessible. This specification discloses a hybrid arrangement in which all material is retained on-line, but is progressively degraded as it becomes less useful, with off-line storage of the source material. On-line browsing of an entire library remains possible, but without incurring the expense of maintaining the entire library at source quality on-line.

19 Claims, 15 Drawing Sheets

| Byte3 | Byte2 | Byte1 | Byte0 |
|-------|-------|-------|-------|
| 31:30 | 29:8  |       | 7:0   |
| type  | length |      | label |

Figure 3

```
CodebookID: Wavelet_SIF_2D_YUV_0 ;
QualityTags: scale, fidelity, colour ;
QualityDivisions : scale(full, half, qtr), fidelity(lossless, high, medium, low), colour(luma, yuv) ;
OriginalSize: width=352, height=288 ;

Label: 0           // root subband, significance level 10
{
        Dependency: ;
        QualityParams : scale=qtr, fidelity=low, colour=luma ;
};

Label: 1           // root subband, significance level 8
{
        Dependency: 0 ;
        QualityParams : scale=qtr, fidelity=medium, colour=luma ;
};

Label: 2           // root subband, significance level 4
{
        Dependency: 1, 0 ;
        QualityParams : scale=qtr, fidelity=high, colour=luma ;
};

Label: 3           // root subband, significance level 2
{
        Dependency 2, 1, 0 ;
        QualityParams : scale=qtr, fidelity=lossless, colour=luma ;
};

Label: 4           // HL subband at depth 1, significance level 10
{
        Dependency: 3, 2, 1, 0 ;
        QualityParams : scale=half, fidelity=low, colour=luma ;
};

Label: 5           // HL subband at depth 1, significance level 10
{
        Dependency: 3, 2, 1, 0 ;
        QualityParams : scale=half, fidelity= medium, colour=luma ;
};

Label: 8           // LH subband at depth 1, significance level 10
{
        Dependency: 3, 2, 1, 0 ;
        QualityParams : scale=half, fidelity=low, colour=luma ;
};

Label: 9           // LH subband at depth 1, significance level 8
{
        Dependency: 3, 2, 1, 0 ;
        QualityParams : scale=half, fidelity=medium, colour=luma ;
};

Label: 12          // HH subband at depth 1, significance level 10
{
        Dependency: 8, 3, 2, 1, 0 ;
        QualityParams : scale=half, fidelity=low, colour=luma ;
};

Label: 13          // HH subband at depth 1, significance level 8
{
        Dependency: 12, 8, 3, 2, 1, 0 ;
        QualityParams : scale=half, fidelity=medium, colour=luma ;
};
```

Figure 6

```
CodebookID: Mpeg1_GOP9_0;
QualityTags: playrate;
QualityDivisions: playrate (normal, fast, vfast);

Label: 0  // I-Frame
{
        Dependency: ;
        QualityParams: playrate=vfast;
        TemporalPriority = 0;
};

Label: 1  // P-Frame
{
        Dependency: 0;
        QualityParams: playrate=fast;
        TemporalPriority = 1;
};

Label: 3  // B-Frame
{
        Dependency: 1, 0;
        QualityParams: playrate=normal;
        TemporalPriority = 2;
};
```

Figure 10

```
CodebookID: DV_0;
QualityTags: scale;
QualityDivisions: scale (full, half);
OriginalSize: width=704, height=576;

Label: 0   // Field 0 8-by-8 and field 0/1 2-by-4-by-8 DCT blocks
{
        Dependency: ;
        QualityParams: scale=half;
};

Label: 1   // Field 1 8-by-8 DCT blocks
{
        Dependency: 0;
        QualityParams: scale=full;
};
```

Figure 13

METHOD OF AND APPARATUS FOR DIGITAL DATA STORAGE

TECHNICAL FIELD

This invention relates to a method of and apparatus for digital data storage.

BACKGROUND OF THE INVENTION

The growing importance of digital media places increasingly severe demands on the resources within a distributed system, particularly as regards network bandwidth and data storage. Faster client and server systems and increasingly large and sophisticated media files lead to increased expectations by users of being able to access and manipulate these files easily. Whilst bandwidth issues receive much attention from the designers of the systems that handle digital media, the high cost of storing digital media is becoming significant, despite the falling costs of many kinds of storage.

The traditional approach to reducing digital media storage costs is to migrate little used material from on-line delivery platforms, such as the hard drives of PCs and servers, onto lower cost archival storage, such as tape. The cost and delay in retrieving such archived media and delivering it on-line can be quite considerable, however. This cost is becoming increasingly apparent to system designers.

Another approach to reducing data storage costs is to retain digital data within the on-line delivery system, but to compress it. Compression technology can significantly increase the amount of material available on-line, but may degrade the material and thus imposes a uniform level of quality. This may be below the minimum quality threshold for some users. It is not always possible to know a priori the requirements of all the users for the media and conventionally there is no mechanism for recovering quality once it has been lost. Hence, traditional compression approaches are inherently limited.

One of the problems of compression schemes is that they take no account of the varied and possibly conflicting requirements made upon the media by the shared access of multiple clients. Most compression schemes utilise an "all-or-nothing" principle: until the media is completely delivered and fully decoded, the user cannot browse or examine it in order to decide whether it is what they wanted. If not, then there is no option but to discard it completely. This is obviously an inefficient use of resources.

Recent work has concentrated on improving the usability of media over networks, and reduce inefficient use of network resources, by introducing "progressive" compression schemes One such 'progressive' scheme is disclosed in U.S. Pat. No. 5,880,856 to Microsoft Corporation, which teaches a particular approach to the use of wavelet transforms. In the U.S. Pat. No. 5,880,856 patent, an image is transformed using the wavelet transformation to yield 4 or 5 decomposition levels, with a base decomposition level giving a low resolution image, and increasingly higher decomposition levels giving higher resolution images. The client receives initially only the base decomposition level data, but the low resolution image resulting from the base decomposition level data gradually sharpens up as higher decomposition levels are received and decoded. Sharpening up of the image occurs as a result of 2 factors: first, as all of the 4 sub-bands which form each decomposition level are received and decoded, the image quality level increases slightly. As successive decomposition levels are received and decoded, the image quality increases more significantly. One characteristic of the system taught in the U.S. Pat. No. 5,880,856 patent is that the sub-bands and decomposition levels are all transmitted to clients in the same, fixed order, which is relatively inflexible. Whilst this scheme allows the client control over quality, it provides no other parameters that can be controlled.

Further reference may be made to the paper by Beong-Jo Kim, Zixiang Xiong and William Pearlman, "Very Low Bit-Rate Embedded Coding with 3D Set Partitioning in Hierarchical Trees", submitted to IEEE Trans. Circuits & Systems for Video Technology, Special Issue on Image and Video Processing for Emerging Interactive Multimedia Services, September 1998. This paper discloses applying a SPIHT compression scheme to a wavelet-based transform, which yields a bitstream encoding multiple spatial resolutions, with progressive quality ordering within a given spatial resolution, as in the U.S. Pat. No. 5,880,856 patent.

Another system for scalable video transmission is disclosed in U.S. Pat. No. 5,768,535 "Software-based encoder for a software-implemented end-to-end scalable video delivery system". Here, the scalable property of a hierarchical image decomposition, similar to the wavelet transform, is used in conjunction with vector quantisation to produce a stream that scales in spatial and temporal resolution. At the receiving end the decoder extracts a stream with the required spatial and temporal properties. Full resolution, full frame rate images can be migrated from disk to CD-ROM to tape as they age, but can be recalled if needed.

A similar system is described in the JPEG 2000 image coding system draft specification (ISO/IEC CD15444-1: 1999). This describes a coding method for still pictures using a wavelet transform in conjunction with coefficient significance-ordering in a manner similar to the SPIHT system described above. Markers are inserted into the bitstream to allow the decoder to extract a reconstructed image of the desired quality.

Yet another approach is disclosed in U.S. Pat. No. 5,953,506 "Method and apparatus that provides a scalable media delivery system", which describes a system for encoding multimedia data in MPEG format as a base stream and a set of additive streams that can be combined to provide various quality levels to satisfy the requirements of different clients. The invention adapts to changing network bandwidth by adding or removing streams, according to a Client-provided profile, and so increasing or reducing bit-rate. It is designed to satisfy a straightforward streaming model of media delivery, where a media steam is produced by the Server and consumed by the Decoder.

The five prior art disclosures described above are designed to present media to a client over a network in a more user-friendly manner than previously, removing, to some extent, unacceptable delay due to the properties of the network. They are not designed from the point of view of a storage system, neither do they present a view of the underlying structure of the file that would allow a storage tool to determine how to degrade quality in a controllable way.

They are also specific to particular media encoding formats, in that the tools that manipulate the media in the quality domain need to know the details of the encoding scheme in order to function. Most importantly, such tools cannot be made to be independent of encoding format, and to work correctly with any media file with any media encoding.

To do these things knowledge is required of the way that a component of the media depends on other components, in order for decoding to be possible.

New systems for media manipulation require more flexibility as regards access and retrieval of material in the storage hierarchy. Such systems must be capable of the following:

Randomly to access any component of the media, where a component can be a time-ordered sequence of media parts, a media part sampled at a particular time, a spatial area within a media part, a colour within a media part, or any other aspect which can be described.

To access the above components at a quality, spatial resolution or frequency resolution specified by the client.

To allow the results of any such access to be refined in such a way as to increase the information content and consequently improve the visual quality, amount of detail, or other aspect, of the material.

To perform the above operations using format-independent tools.

In order to satisfy the requirements listed above a system is required for structuring media files of any type for the maximum flexibility of access of their constituent components.

SUMMARY OF THE INVENTION

In accordance with a first aspect of the invention, there is provided a method of storing digital data comprising the steps of:

providing a media object at a given quality level;

manipulating the media object, using a reversible function, into a first data part, from which a version of the media object can be re-generated at a given quality, the first data part being stored on a first storage medium which is accessible on-line;

manipulating the media object, using a reversible function, into a second data part, the second data part being re-combinable with the first data part to enable a version of the media object to be regenerated which is of higher quality than the quality of the version of the media object which could be re-generated using only the first data part;

transferring the second data part to a second storage medium which offers substantially cheaper storage than the first storage medium.

Hence, this invention reconciles the competing needs for low-cost storage with immediate on-line access. Typically, an implementation of the invention provides for a complete library of all media objects to be made available using an on-line accessible version of each media object. Each on-line accessible version is stored using on-line storage media.

The quality of an on-line accessible version typically reflects the perceived usefulness or relevance of the version at a given time: rarely used versions may be at a very low quality, whilst frequently used versions may be at a very high quality (and may even be retained at source quality). A high quality version (or the data needed to re-generate a high quality version, if different) of each media object is stored on lower cost media, typically near on-line or off-line media. That high quality version (or the data needed to re-generate a high quality version, if different) is accessed only when needed.

This is clearly superior to conventional archiving systems, in which there is no facility to browse on-line the entirety of a large collection of media objects, with data for less useful or relevant objects in the collection only being partly held off-line and partly on-line.

The term 'quality' should be expansively construed to refer not only to conventional 'quality' attributes, such as distortion, scale and temporal characteristics, but also any other characteristics which affect the usefulness of an image. Hence, for example, in an embodiment of the present invention used in a surveillance system, a low quality image might refer to an image in which no movement has been detected, whereas high quality images are those images in which movement has been detected. In such an embodiment, it is the high quality images containing movement (or the data needed to re-generate images containing movement) which may be stored on-line, whereas images showing no movement (or the data needed to re-generate images containing no movement) may be stored entirely off-line.

Preferably, any degree of compression may be applied to a media object to obtain the first data part; compressed media objects, occupying relatively little space, can be stored economically on expensive on-line storage media, yielding many of the advantages of on-line retrieval. As noted above, the ability, conventionally provided by archival systems, of recovering the source, is provided by the second data part stored on the lower cost media.

The first data part may be subject to regular, iterative manipulations, each of which further degrades quality and reduces data size, if the first data part is accessed infrequently or not at all. In this way, an intelligent media management system can be constructed which offers users the ability to browse material on-line which would conventionally have to be relegated to archival storage, but which automatically ensures that rarely accessed material is progressively degraded to a given threshold so that it occupies the minimum of expensive on-line storage resources.

Hence, for example, an entire library of digital images may be stored using this approach. Rarely used images may be manipulated into low quality digital images, which are each maintained available for on-line retrieval. Frequently used images may be subject to no such manipulation. Higher quality images of each manipulated digital image (or the data needed to re-generate each high quality version, if different) are maintained on lower cost storage media, such as near on-line (for example, juke-box CD-ROM) or archival media such as tape storage. The lower quality images are adequate for browsing and the higher quality images (or associated data), which may be at the quality of the source, are delivered to a user only when needed.

A preferred embodiment applies the concept of indexed layers of information, which are referred to as Partitions in this specification. Partitions are particularly useful since manipulation is straightforward: it can simply comprise the process of separating or splitting layers, with layers relevant to the lower quality, on-line version being split from layers relevant to the higher quality, off-line version. The inverse of the splitting process is needed to recombine previously split layers. Using a layered bitstream also removes the need to apply a separate layering process since the data is already encoded in an embedded and hierarchical object, formed with the data partitioned into a variable and ordered set of indexed layers or partitions.

Theoretically, an infinite level of partitions could be created but the practical and commercial limitations on the implementation will constrain the number of partitions to manageable and maintainable levels. With advances in digital media storage and codec technology, the number of partitions may increase as desirable.

In a sophisticated implementation, the partitioning process can be automated using defined criteria that may be a feature of an individual or a system wide profile. There are many criteria which can be used to control the process. The criteria may be held as a profile which is used to determine, for each application of the partitioning function, exactly how the object is split.

The criteria may include:
The time elapsed since object creation.
Metadata associated with the original source material.
Usage patterns.
Availability of storage.
Flags set by users to register interest.

Data access can be automatically altered by the step of viewing a version of a media object, using a defined content access model. This may be redefined by some modifier as and when required by the model. This might be limited to methods such as once a user has viewed the media for the first time his subsequent views are reduced in quality.

The present invention may be implemented on a client server network, in which the on-line accessible data (i.e. the first data part) for each media object resides on a server which is connected to one or more clients over a network. The term network should be expansively construed to cover any kind of data connection between two or more devices.

In an S.A.N (Storage Area Network) environment, for example, the deployment of the object need not be restricted to a particular media or network component; the system could choose to distribute the object. For example, in a S.A.N. which is a server cluster, the servers do not necessarily act as a resilient or fault tolerant backup, but instead offer massive parallel storage arrays through a common interface. With the present invention, objects may be split in a manner that allows for efficient and manageable use of bandwidths and media costs, since in essence it is only data that is needed that is actually moved, rather than an entire object. Hence, with partitioned data, it is possible to reduce the I/O demand for the storage sub-systems.

In another aspect of the present invention, there is a method of recovering a media object which has been stored using the above inventive methods, comprising the step of recombining the first data part and the second data part using the reverse of the function. In a further aspect, this invention encompasses digital data stored using the storage methods described above. In another aspect, there is a computer program which, when running on a client, enables the client to receive and playback a media object previously stored using any of the above methods. In a further aspect, there is a computer program which when running on a computer enables the computer to perform any of the above methods. In a penultimate aspect, a computer programmed to perform any of the inventive methods is disclosed. In a final aspect, this specification discloses a computer network comprising several computers, at least one of which performs the data storage method claimed above and enables users to access the different versions of the media object

BRIEF DESCRIPTION OF THE DRAWINGS

The invention will be described with reference to the accompanying drawings, in which:

FIG. 3 is a schematic representation of the format of the 'chunk' data structure according to the present invention;

FIG. 6 is an example of a fragment of a Codebook for the labelling example of FIG. 5, according to the present invention;

FIG. 10 is an example of a fragment of a Codebook for the labelling example of FIG. 9, according to the present invention;

FIG. 13 is an example of a fragment of a Codebook for the labelling example of FIG. 12, according to the present invention;

DETAILED DESCRIPTION

A. Key Concepts

Figure 1:
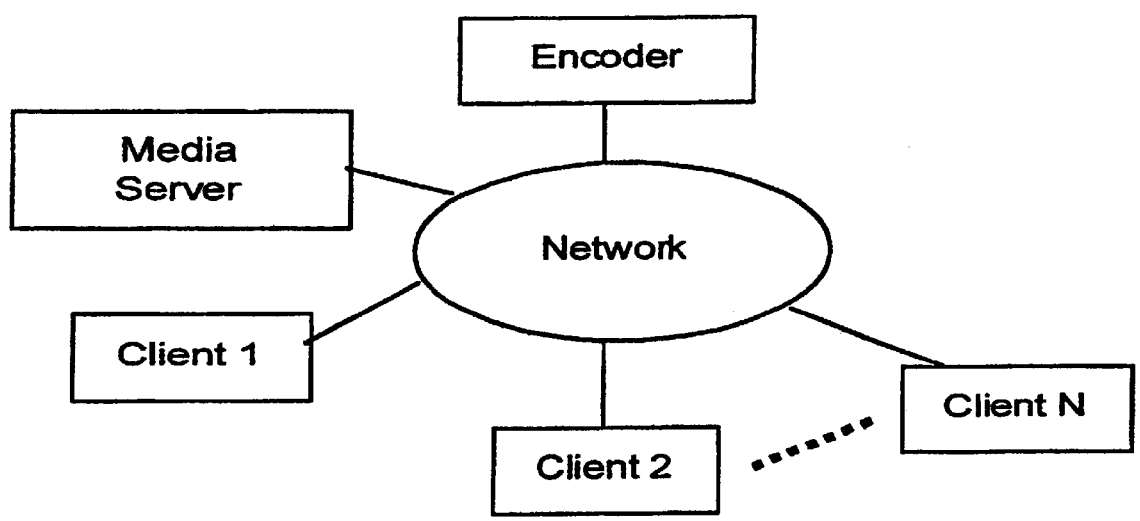
FIG. 1 is a schematic representation of a network used in performing the method of media file delivery according to the present invention.

Block-based, motion compensated encoding schemes.

There are several examples of block-based encoding schemes that use Discrete Cosine Transform, motion detection and compensation to compress video by removing spatial and temporal redundancy from the source. Of these, the most familiar is MPEG (i. e. MPEG-1 or MPEG-2). MPEG utilises three types of compressed picture: I-frames, P-frames and B-frames. An I-frame is built up from 16×16 pixel square blocks (Macroblocks) of image, represented as a set of spatial frequencies obtained through the Discrete Cosine Transform (DCT), where the low spatial frequencies are generally represented with much greater accuracy than the high spatial frequencies. Temporal redundancy is removed using P (predicted) and B (Bidirectional) frames. A particular Macroblock in a P-frame is generated at the encoder by searching a previous I-encoded frame (or P-frame) for a Macroblock which best matches that under consideration. When one is found the vector is calculated which represents the offset between the two. This motion vector, together with the error between the predicted block and the actual block, is all that need be sent in order to reconstruct the P-frame at the receiver. The third kind is called a B (Bi-directional) frame. B-frames are based on motion vectors obtained by past and future I and P-frames; they provide a smoothing effect, increase the compression factor and reduce noise.

Because P-frames are computed from previous P-frames, errors can build up, so it is necessary periodically to insert I frames. A typical MPEG sequence of frames may look like this:

I B B P B B P B B I B B P B B P B B I . . .

From the point of view of the present invention, MPEG exemplifies three properties of encoded media files that are factors in the design of a system such as is described here.

The first property is that the initial sample structure is preserved through the encoding, i.e., the identity of individual frames is not lost in the encoded bitstream. This means that temporal properties can be manipulated by adding or removing frames in the compressed domain. Secondly, a temporal window is defined (the MPEG Group of Pictures or GOP) within which temporal redundancy is exploited to achieve compression. Thirdly, a complex set of dependencies is defined by the encoding; in MPEG, P-frames require I-frames, and B-frames require I and P-frames, for decoding.

There are other examples of block-based encoding schemes that utilise motion detection and compensation including H.261 and H.263.

Block-based intra-frame only encoding schemes.

There are other schemes, notably JPEG and DV (as defined in SMPTE 314M-1999), that use block-based encoding without motion compensation. In both JPEG and DV, the basic scheme is to transform blocks of pixels into frequency components using the DCT, quantise the components by multiplying by a set of weighting factors, then variable-length code the result to produce the encoded bitstream. DV, however, introduces the concept of feed-forward quantisation that optimises the compression process prior to compression being applied. To do this the DCT-transformed image is examined and classified into areas of low, medium and high spatial detail. Using this information, different tables of quantisation factors are selected and used according to area, with the object of matching the fidelity with which frequency coefficients are represented, to the frequency response of the human visual system.

A second feature of DV is it's use of block-based adaptive field/frame processing. What this means is that a 64-entry DCT block can represent either an 8-by-8 area of pixels in a de-interlaced frame (an 8-8 DCT), or two 4-by-8 areas in the first and second fields of a frame (a 2-4-8 DCT). The choice between the two is done by detecting motion. The former scheme is used if there is little motion occurring between fields, the latter if motion is detected; this choice being made on a per-block basis.

As with MPEG encoding, three observations can be made about the nature of the encoded bitstream. As before, the sample structure is preserved through the encoding; secondly, a temporal window is defined which, in this case, represents the two fields of a frame. Thirdly, a set of dependencies is defined: for example, dependencies exist between the fields within a frame wherever 2-4-8 DCT blocks have been generated.

Subband encoding schemes.

A more recent alternative to a block-based encoding scheme using a transform such as DCT, is a subband encoding whereby a complete image (rather than small blocks thereof) is processed into a set of frequency/space limited bands, sometimes referred to as scales. An example of this is the Wavelet Transform.

The wavelet transform has only relatively recently matured as a tool for image analysis and compression. Reference may for example be made to Mallat, Stephane G. "A Theory for Multiresolution Signal Decomposition: The Wavelet Representation" IEEE Transactions on Pattern Analysis and Machine Intelligence, vol. 11, No.7, pp 674–692 (July 1989) in which the Fast Wavelet Transform (FWT) is described. The FWT generates a hierarchy of power-of-two images or subbands where at each step the spatial sampling frequency—the 'fineness' of detail which is represented—is reduced by a factor of two in x and y. This procedure decorrelates the image samples with the result that most of the energy is compacted into a small number of high-magnitude coefficients within a subband, the rest being mainly zero or low-value, offering considerable opportunity for compression.

Each subband describes the image in terms of a particular combination of spatial/frequency components. This is illustrated in FIG. 2A. Here, a wavelet filter is applied twice to an image. After the first application 4 subbands at Level 0 result, with each subband a quarter the scale of the original; after the second application, four new one-eigth-scale subbands are created. To reconstruct an image fully, the procedure is followed in reverse order using an inverse wavelet filter. The Figure also illustrates the scheme used to name subbands: 'L' and 'H' refer to Low-pass and High-pass wavelet filters which are applied in x and y to generate a subband. Applying the H filter in both x and y gives the 'HH' subband, applying 'L' in x and 'H' in y results in a 'LH', and so forth.

Figure 2:
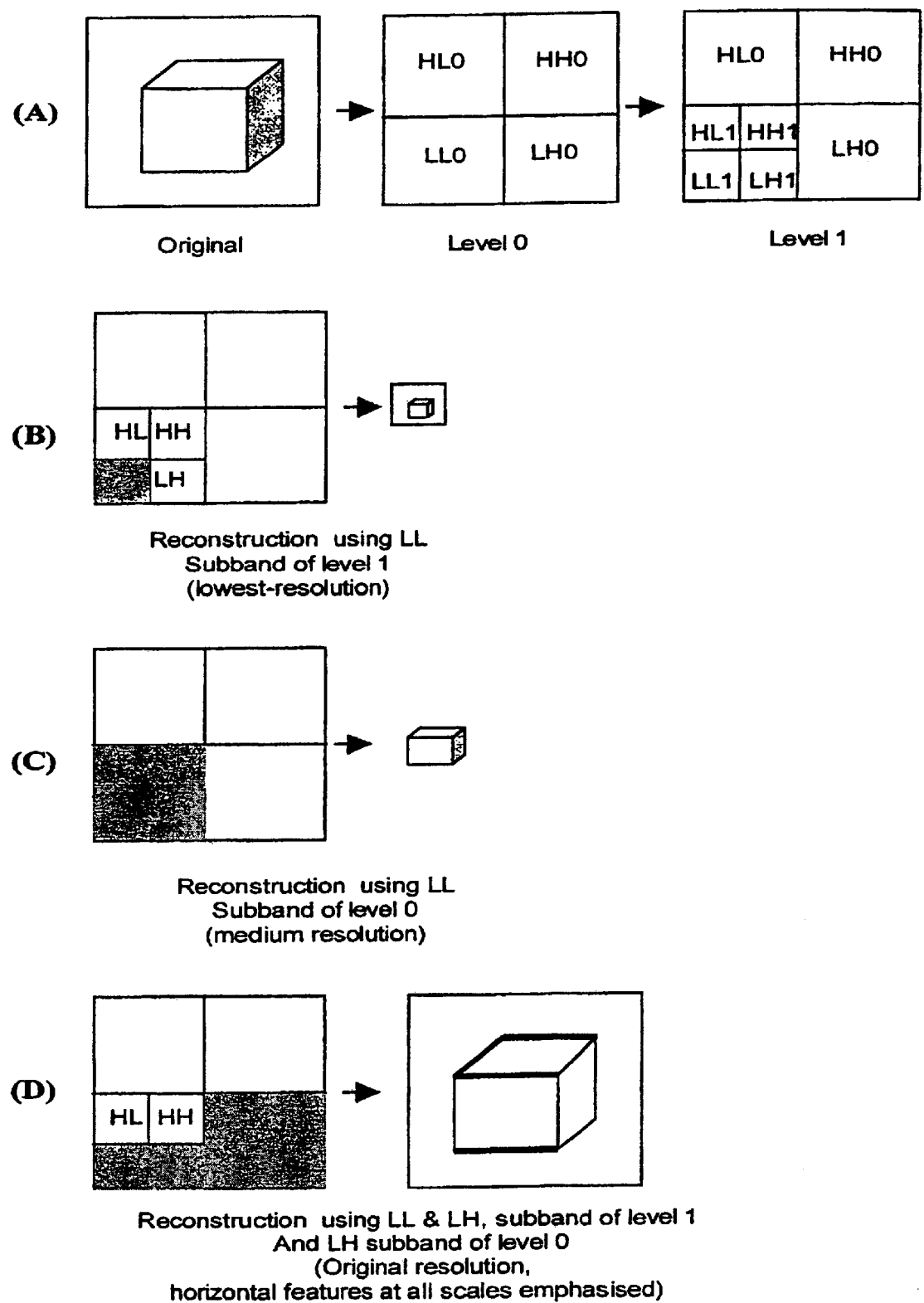
FIG. 2 is a schematic representing the sub-bands which result from applying wavelet transforms to an image in a conventional multi-scale decomposition with examples of partial reconstruction according to the present invention.

Subbands need not always be fully reconstructed into the original image; they may be combined in different ways to produce a final image to satisfy some set of individual requirements. Three examples are shown in FIG. 2. In FIG. 2B, the LL sub-band of Level 1 is used as a one-sixteenth scale version of the original. In FIG. 2C, the four subbands of Level 0 are inversely transformed to reconstruct a one-quarter resolution version of the original. In the third example, FIG. 2D, the LL and LH sub-bands of Level 1 are used, together with the LH sub-band of Level 0 to reconstruct an original resolution image, but with horizontal features at all scales emphasised.

Image Tree-based Compression.

Tree-based data structures can be used by compression schemes to exploit spatial redundancy in images. A recent development of such a scheme is the SPIHT algorithm; see Beong-Jo Kim, Zixiang Xiong and William Pearlman, "*Very Low Bit-Rate Embedded Coding with 3D Set Partitioning in Hierarchical Trees*", submitted to IEEE Trans. Circuits & Systems for Video Technology, Special Issue on Image and Video Processing for Emerging Interactive Multimedia Services, September 1998.

The SPIHT algorithm is an effective compression step for use in conjunction with a wavelet transform, since it can efficiently exploit the decorrelation of the input image provided by the transform to get high levels of data reduction. For the purposes of the present invention a key feature of the SPIHT algorithm is its ability to analyse the transformed image in terms of Significance. It efficiently locates and partially orders all the samples with respect to bit-significance, i.e., the position at which the highest-order bit in a sample is set. Since this corresponds to the magnitude of the sample, the samples are effectively ordered with respect to their energies, or the contribution they make to the reconstructed object. A significance layer is generated by choosing a bit-position and outputting the value of that bit-position (1 or 0) for all the samples for which that bit-position is defined.

As with MPEG encoding, a set of dependencies between related image components is defined by schemes such as Wavelet/SPIHT compression. In this case, a significance layer can be decoded only if the next highest significance layer can also be decoded. Similarly, to decode a subband (e.g. LH0 in FIG. 1) the parent subband (LH1 in FIG. 1) must also be decoded.

3D Schemes

The Wavelet and SPIHT compression schemes can be extended to the third (time) dimension in a fairly straight-forward manner. In this case a sequence of frames are captured and are treated as a 3-dimensional block of data. The wavelet filter is applied along the time dimension as many times as it is along the vertical and horizontal dimensions, resulting in a transformed block comprising a set of spatio-temporal cubes, each of which is a subband. The 3D-SPIHT algorithm represent these subbands in terms of octtrees (as opposed to quadtrees in the 2D case) and generates the bitstream accordingly.

Other compression schemes can also be used in the present invention, as will be appreciated by the skilled implementer.

B. System Description

The system capable of performing the method of the present invention comprises an Encoder, a Network, a Server and N clients, as shown in FIG. 1.

A Encoder compresses the incoming media, structures it into layers and adds layer labelling information as described in the next section, prior to transmitting it as a bitstream over a digital communications network, to be stored on the Server.

In FIG. 1, there are N clients, each of which engages in a session with the media Server during which media content and control information are transmitted. For each client a control channel to the Server is maintained which allows that client to request that media be transmitted to it. The types of requests that can be made include (but are not limited to) the following:

Seek to a particular point in the media file.

Transmit a media clip at a particular quality.

Transmit extra information to improve in a specified way the quality of the media at the Client.

These requests support a variety of useful application-level functions at the Client such as video previewing using fast-forward and rewind, single-frame stepping forwards and backwards, and freeze-frame. For example, in a media browsing application, a low-quality version of the media may be sent to the client with very little latency, to allow the user to start work immediately, for example, on rapidly scanning through a file to locate items of interest. Initially the user may not so much be interested in the absolute quality of the media, as in the responsiveness of the system to requests to move rapidly from one point to another. Having found an item of interest the application may then determine that this particular section of the media is to be rendered at greater quality and issue an appropriate request to the Server. The Server calculates which extra layers should be delivered to improve the media information in the way required and transmits only those layers. Note that no extra processing of the media file is required during this procedure other than to locate and send the appropriate sets of data. Note also that the quality improvement may occur in a number of ways, including:

Increasing the temporal resolution of the media (i.e., for video, allow more individual frames to be resolved).

Increasing the spatial resolution of the video.

Increasing the sampling frequency of the audio.

Decreasing the degree of distortion of the media.

Central to the working of this scheme is the mechanism used to convert a media file in any encoding format, including those described in the preceding section, into a layered format with properties that support the operations described above. This is the purpose of Layer Labelling as described in the next section.

C. Description of Layer Labeling

Overview

A Layered bitstream is built out of a media encoding by splitting it up into packets (called chunks here) in a manner determined by the encoding type, and appending Labels to the chunks that uniquely describe their contribution to the reconstructed file. In order that distributed tools can be built and configured to understand the formats of many layered bitstreams in a distributed environment, static signalling information (constant throughout a stream's lifetime) is made available, either as a reference to a globally available file, or as data sent once in the bitstream. For configuration information that must vary within the stream, provision is made for dynamic signalling information to be carried in the bitstream.

To be successful the labelling scheme must do three things well:

Efficiently and controllably allow parts of a media file to be selected to obtain a particular quality of service to satisfy media quality, bit-rate or latency requirements.

Efficiently support the location and transmission of those parts of the media necessary to reconstruct a particular item to a specified quality.

Encapsulate the underlying media encoding and hide complex details while offering a uniform, media encoding-independent, layered view of the file.

The first requirement is addressed through the concept of a Filter that specifies which parts of the file are to be selected for transmission. The second requirement needs inband signalling information to describe and delineate the layered structure within the bitstream. The third requirement is addressed through an indirection mechanism that maps the subtleties of a particular encoding to the uniform layered view. This indirection mechanism is termed the Codebook. A Codebook is defined for every new encoding scheme, or variations of existing schemes with new parameters.

Layer Labelling Format

This section defines the format of the layer labels used in the present invention to convert a media file to a layered stream format. Streams are stored and transmitted as contiguous groups of chunks, each with a chunk header defining the length and type of the chunk. Some chunk types are reserved for carrying data (termed slices), whereas others are used for signalling.

Extra configuration information for these streams, such as encoding format and slice dependencies, can be associated with the data stream. The static portion of this information can be stored externally, or in-band using signalling chunks; dynamic information is always stored in-band.

Chunk Header

All chunks are introduced by a chunk header, the format of which is illustrated in FIG. 3. All chunks, irrespective of their type, are introduced by one of these headers. The result is a data stream whose structure is fixed, while still allowing room for expansion in the future.

Type

The 2-bit type field is used to distinguish between 4 independent sets of chunk types. (The issue of independence is important, since there is no way to specify a dependency between two labels belonging to different types.) The following type values are currently defined:

data chunks (slices)

signalling chunks

Length

The 22-bit length field gives the length of the chunk in bytes, including the header. A chunk containing no payload information (i.e. just a header) would, therefore, have a length of 4.

Label

The 8-bit label field is the layer label for the chunk. The interpretation of the label is dependent on the type field (see above), so the header format allows for 4 sets of 256 labels.

Terminology

Data chunks (equivalently termed slices) are used to encapsulate a stream of multimedia data. The labels attached to the slices are used to indicate the nature of the slice contents and their dependency relationships with other slices in the stream. Signalling chunks can be used within the stream to pass extra information about the data, such as details about how it has been encoded or filtered.

Slice

The manner in which the slice label allocation is done depends on the exact nature of the multimedia data being encapsulated. There are a set of basic schemes which are mutually agreed between all the tools, but new allocation schemes can be added in order to tailor the system to suit different situations. The only restrictions are:

slices within a data stream must all be labelled using the same allocation scheme;

slices must be labelled uniquely with respect to the data they contain; and label allocation must be done in slice dependency order.

The first restriction is self explanatory, but the others merit further discussion. The slice label is taken as an indication of the data contents of the slice, and is used by the system to separate and merge the slices to obtain data streams of differing quality. In order to allow the stream decoders to be stateless, the slice label must identify uniquely the actual data contents. As a result, slices which are too long to be encapsulated as a single chunk must be split in such a way as to enable the decoder to determine which is the base data and which is the continuation information.

The slice labelling must also reflect the dependency hierarchy, with all slices having numerically lower label values than those which depend on them. This means that when the slices of a stream are encoded in dependency order, the label values increase in line with the progress through a dependency unit (see "context" below). Not only does this simplify the job of merging the slices from data streams which have been split previously, but also allows the boundaries between contexts to be implicit (if a slice label is not numerically greater than its predecessor, then it must belong to a new context).

Context

A group of slices which are related by dependency (either spatial or temporal) is called a "context". As described above, the label values for the slices within the context must be arranged so that they are in numerically increasing order. This usually allows the boundaries between contexts to be detected implicitly, without the need for an explicit signalling chunk. Based on the label allocation scheme described above, slices within the context will also, therefore, be arranged in dependency order such that slices always precede those which are dependent on them.

Because of the number of slice labels available (and the restriction of unique slice labelling), it follows that the maximum number of slices which comprise a context is 256. The dependency hierarchy for the slice labels is defined in a Codebook (see below) and is fixed for the duration of the data stream. Note that it is not mandatory for slice labels to be allocated consecutively (i.e. gaps in the allocation scheme are allowed); nor is it essential for a specific slice label to be present in all contexts.

As well as grouping together slices which are related by dependency, contexts have a very important rôle in defining the boundaries at which editing can be performed. There is no need for explicit signalling chunks to determine valid edit points.

Contexts are assumed to be separated from their neighbours in the temporal domain, and be independent of them; in other words, when contexts are extracted from the data stream, each should be capable of being decoded as a stand alone entity. The one exception: to this is exemplified by encoding schemes such as MPEG which have temporal dependencies between adjacent Groups Of Pictures. This is handled by associating an "overlap" with each context allowing temporal units (see sample below) to be marked as dependent on the immediately preceding context.

The overlap value, stored in the media header (see below), defines how these inter-context dependencies are handled: an overlap value of n implies that the first n samples of a context are dependent on the previous context. Since the normal situation is for contexts to be temporally self-contained, the default overlap value is zero. In the case where it is not zero, the slice dependency hierarchy must reflect the inter-context peculiarities of the encoding scheme, with "phantom" dependencies being added if necessary.

Sample

Multimedia data streams are usually represented as a sequence of discrete units, each with a well defined temporal position in the stream. This is particularly true with video data, which is usually modelled as a set of separate frames (even though the frames may have been reordered and grouped in the encoding process, such as with MPEG). The data streams preserve the natural temporal unit of the encoding scheme, with each discrete unit being termed a sample. Whether a context contains a single sample or a group of samples is dependent on the encoding technique used, but specific techniques usually follow a very rigid repeating pattern. By default, therefore, each context is assumed to contain a fixed number of samples, with the context spacing (samples per context repeat count) defined in the system header (see below).

The distinction between contexts and samples is important when contemplating the temporal dependencies of the multimedia data (such as a 3-D Wavelet/SPIHT scheme) and the ability to perform temporal decimation (such as playing every fourth frame of a video sequence). A context contains the smallest number of samples which make up a temporal encoding unit (GOP for MPEG, GOF for Wavelet/SPIHT), with the spatial and temporal dependencies being handled in exactly the same manner. Within the context, each slice is given a temporal priority (see below) which allows for intelligent decimation of the temporal sequence, but does not in itself imply any kind of temporal dependency.

System Header

The system header is used to define the stream attributes which are relevant at the system layer only. Basically, this means parameters which are needed by the Server to provide the level of service required of them. For example, the default context spacing is needed in order to construct the mappings between contexts and samples.

Media Header

The media header is used to define the stream attributes which are relevant at the media layer only. This means parameters which are needed by the stream decoder in order to make sense of the data stream, but which are not required by the Server. Examples which fall into this category are: the horizontal and vertical resolutions of a video encoding; the inter-context dependency overlap; and a reference to the Codebook which has been used for the encoding.

The reason there is a separate media header chunk, rather than combining the information with that in the Codebook is because Codebooks are generic in nature and tend to be independent of the raw properties of the original media. The media header fills in these details for a specific recording, thus greatly reducing the number of Codebooks which are required by the system as a whole.

Codebook

The Codebook is used to define the dependency and quality relationships of the slices within a context, and is necessary in order to construct a filter for a data stream. Irrespective of whether the dependencies are spatial or temporal, the relationships between the individual slices can be represented as a simple hierarchy: each slice type (i.e. slice with a specific label) has a predetermined set of other slice types on which it is dependent. The nature of the hierarchy is, obviously, dependent on the labelling scheme used; but the Codebook technique allows a great deal of flexibility providing the basic rules of slice labelling are not violated (see above).

In the context of the Codebook, "dependency" has the following meaning. For one slice to be dependent on another, it must be impossible to decode the slice without it. (This is true, for example, with MPEG video where the I frame is necessary before the first P frame can be decoded.) Note that this dependency relationship says nothing about the desirability of slices when it comes to producing results of acceptable quality.

As well as defining the dependency hierarchy, it is the job of the Codebook to store a mapping between the individual slice values and the "quality" of the decoded data stream which include those slices. The stream quality is, by necessity, a vague and subjective factor compared to the strict slice dependencies described above; indeed it is likely that there is more than one quality dimension. For example, 3-D Wavelet/SPIHT encoded video can be thought of as having four quality axes: scale (image size), fidelity (image quality), colour and temporal blur.

The bulk of the Codebook comprises a series of tables (one for each slice label) containing the dependency data, the temporal priority and a set of quality parameters, one for each quality axis. The number and type of quality axes defined is dependent on the nature of the multimedia data and the encoding scheme used. To simplify matters, three important restrictions are applied to quality axes:

Quality axes are assigned names (or quality tags) which have global significance. Codebooks which employ the same quality tag must use the same allocation scheme when it comes to quality parameters for the relevant axis.

Quality parameters are always specified with regard to the highest quality (unfiltered) version of the data stream. In the case of video, for example, this allows a common Codebook to be used irrespective of the image size.

The quality parameters themselves must, where practical, be independent of the actual encoding scheme used. For example, the scale parameters for video data might represent the width or height of a scaled image compared to the original, assuming an unchanged aspect ratio.

The Codebook header contains the list of quality tags for which quality parameters will be found in the tables which follow. This, combined with the restrictions outlined above, allows for filter creation to be done in a manner which is entirely independent of the multimedia data type and encoding scheme. A filter created using a quality axis which is either absent or unspecified always results in slices being unfiltered with respect to that axis.

A combination of an encoding scheme and its parameters is sufficient to uniquely identify a Codebook. Therefore it is possible to programmatically generate a Codebook given this information, and a cooperative implementation of an encoding scheme is ideally suited to the task. However, since the purpose of the Codebook is to generate filters, in an environment where the encoder or decoder is available it becomes feasible to have the implementation of the encoding scheme generate the filters directly, thus removing the necessity to keep track of the Codebook.

Temporal Priority

It is often necessary to decimate a data stream, either to reduce the bandwidth requirements or to play it at faster than normal rate. Given the different data encoding schemes, it is not always sensible to work with naive subsampling schemes such as "one sample out of every four". There are two reasons for this.

The inter-slice dependencies of the relevant samples may prohibit simple decimation. This is true, for example, with MPEG video, where there is a complex web of temporal dependencies between the I, P and B frames.

When attempting to maintain a cache of slice data and ensure effective use of available bandwidth, it is essential that repeated (or refined) sub-sampling requests should be carefully orchestrated so as to maximise the data overlap.

Accordingly, each slice in a context is assigned a temporal priority which is used to control decimation. For example, in MPEG video, slices belonging to the I, P and B frames would be allocated temporal priorities of 0, 1 and 2 respectively. It is these temporal priorities which are used when performing temporal filtering below the level of the context.

Signalling Chunks

The signalling chunks are used to identify and annotate the data chunks in a data stream. Whether they are stored together by Servers or generated on the fly at the time of delivery is an implementation detail which is outside the scope of this document. The signalling chunks fall into three distinct categories: static, dynamic and padding.

Static Chunks

The static chunks define parameters which do not change during the lifetime of the data stream. This includes the definitions of the basic default values which apply to the whole stream, such as the identity of the Codebook which has been employed to generate the data slices. Since these chunks are static, there is no necessity for them to be included as part of the data stream: it is just as valid for the information to be sent out-of-band or, as in the case of re-usable Codebook tables, by reference. If they are transmitted or stored in-band, however, they must be unique, precede the first data slice and be stored in numerically increasing opcode order.

Dynamic Chunks

The dynamic chunks define those parameters which vary depending on their position within the data stream. This includes filtration information, since the filters used to generate the stream can vary as the slices are delivered. It also includes all the variable context and sample information, such as the indication of "seek" operations and the handing of contexts with a context spacing which is not constant. Dynamic chunks, by their very nature, carry positional information within the data stream, and hence must always be sent in-band. Where present, dynamic chunks are only valid at context boundaries.

Padding Chunks

The padding chunks have no semantic influence on the data stream, and hence can be positioned at any chunk boundary.

Static Signalling Chunks

System Header

Type: Static

Opcode: 00×0

Contents: Information which is specific to the system layer only (Media Server), and is not required to filter or decode the data stream. The parameters are:

context spacing

Format: Name/Value pairs.

Status: Mandatory.

Position: Out-of-band, or in-band before first data slice.

Media Header

Type: Static

Opcode: 0×01

Contents: Information which is specific to the media layer only (Decoder), and is not required for the operation of the Media Server. The parameters are:

original media parameters context dependency overlap

Codebook Reference

Format: Name/Value pairs.

Status: Mandatory.

Position: Out-of-band, or in-band before first data slice.

Codebook

Type: Static

Opcode: 0×02

Contents: Information which is specific to the generation of slice filters only, is not required for the operation of the Media Server or Decoder.

quality tag list slice dependency information slice quality information slice temporal priority information Status: Mandatory.

Position: Out-of-band, by reference, or in-band before first data slice.

Meta Data

Type: Static

Opcode: 0×04

Contents: Information which is pertinent to the data stream, but which is not required for its storage, filtration or transmission. Examples are:

date, time & location edit history copyright notice

Format: Name/Value pairs.

Status: Optional.

Position: Out-of-band, or in-band before first data slice.

User Data (1,2,3,4)

Type: Static

Opcode: 0×05, 0×06, 0×07, 0×08

Contents: Private information, added into the data stream by the generator of the encoding, but which is not interpreted by the system in any way.

Format: Opaque byte array.

Status: Optional.

Position: Out-of-band, or in-band before first data slice.

Dynamic Signalling Chunks

Baseline

Type: Dynamic

Opcode: 0×80

Contents: Information regarding the stream's current position with respect to the context and sample sequence numbers, and is usually used to indicate a "seek" operation within the data stream. Has two parameters, either of which can be omitted if the value can be inferred from the stream position:

context sequence sample sequence

At the start of a data stream, unless otherwise specified, it is assumed that the context and sample sequence numbers both start at zero.

Format: 64-bit little-endian binary.

Status: Optional.

Position: In-band at context boundaries.

Context Start

Type: Dynamic

Opcode: 0×81

Contents: A context spacing for the immediately following context.

Format: 32-bit little-endian binary.

Status: Optional. Only necessary if the context spacing is different to the default.

Position: In-band at context boundaries.

Context End

Type: Dynamic

Opcode: 0×82

Contents: None.

Format: n/a

Status: Optional. Only necessary if context boundary cannot be determined by simple comparison of slice type values.

Position: In-band at context boundaries.

Filter Definition

Type: Dynamic

Opcode: 0×83

Contents: Used to encode stream filtration information for the data slices which follow. It takes the form of a pair of bit sequences (possibly compressed) indicating which data has been filtered out of the subsequent stream.

The slice mask indicates which of the 256 possible slice types have been filtered out of the data stream. It does not imply that the remaining slice types will be found in the stream; nor does it guarantee that the slices which are present conform to the dependency criteria specified in the Codebook.

The context mask is used to indicate which whole contexts have been filtered out of the data stream. Each context has a unique position in the sequence, and mask refers to the position value modulo 240 (a number chosen because of its numerical properties, being the common multiple of 2, 3, 4, 5, 6, 8, 10, 12, 15, 16, 20, 24 and 30). Unlike the slice mask, the context mask can be used to determine which contexts are present and which are absent. In the case of inter-context dependencies, however, there is no guarantee that the relevant information is actually present.

Status: Optional.

Position: In-band at context boundaries

Padding Signalling Chunk

Padding

Type: Dynamic

Opcode: 0×ff

Contents: Opaque byte array. Padding chunks may be necessary in the case where fixed bit-rate streams are encoded or specific byte alignments are required. They can also be used to re-label a slice in place for data filtration experiments.

Figure 4:
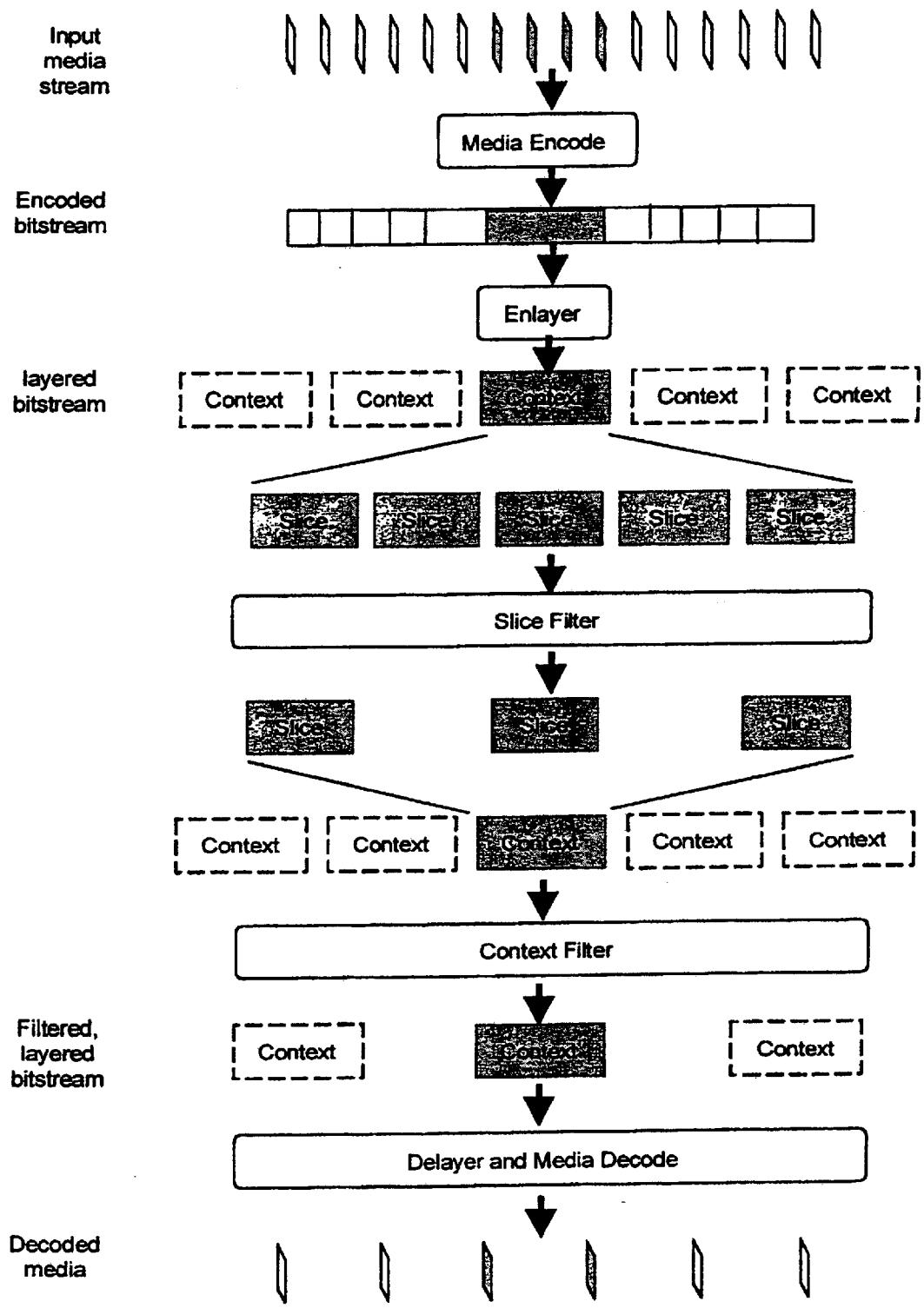
FIG. 4 is a schematic representing the typical path of a unit of media through the layering system according to the present invention.

Format: Opaque byte array.
Status: Optional.
Position: In-band.
Layer Labelling, Filtering, Merging and Codebook Examples FIG. 4 gives an overview of some typical transformations undergone by a media file as it is layered, filtered and decoded. In particular, the Figure shows the two styles of filtering that are possible: filtering at the Slice level (within a dependency unit), and filtering at the Context level (across entire dependency units). Slice-level filtering can be used to change the colour depth, spatial resolution, fidelity or temporal resolution of the media. Context-level filtering has a coarser 'grain' and is designed mainly to support temporal decimation of the media.

D. Wavelet Example

Figure 5:
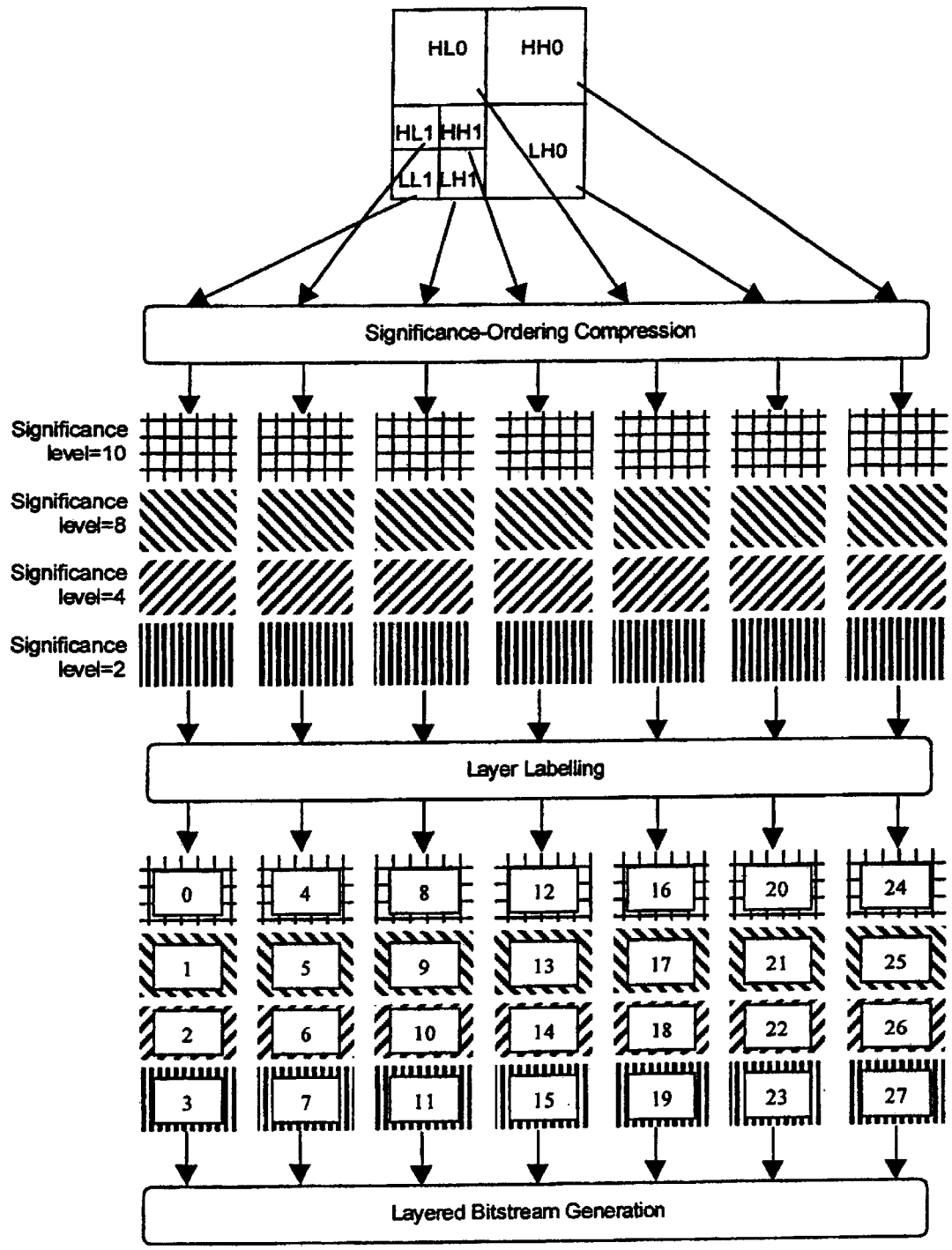
FIG. 5 is a schematic representation of the labelling mechanism as applied to a wavelet encoding according to the present invention.
Figure 7:
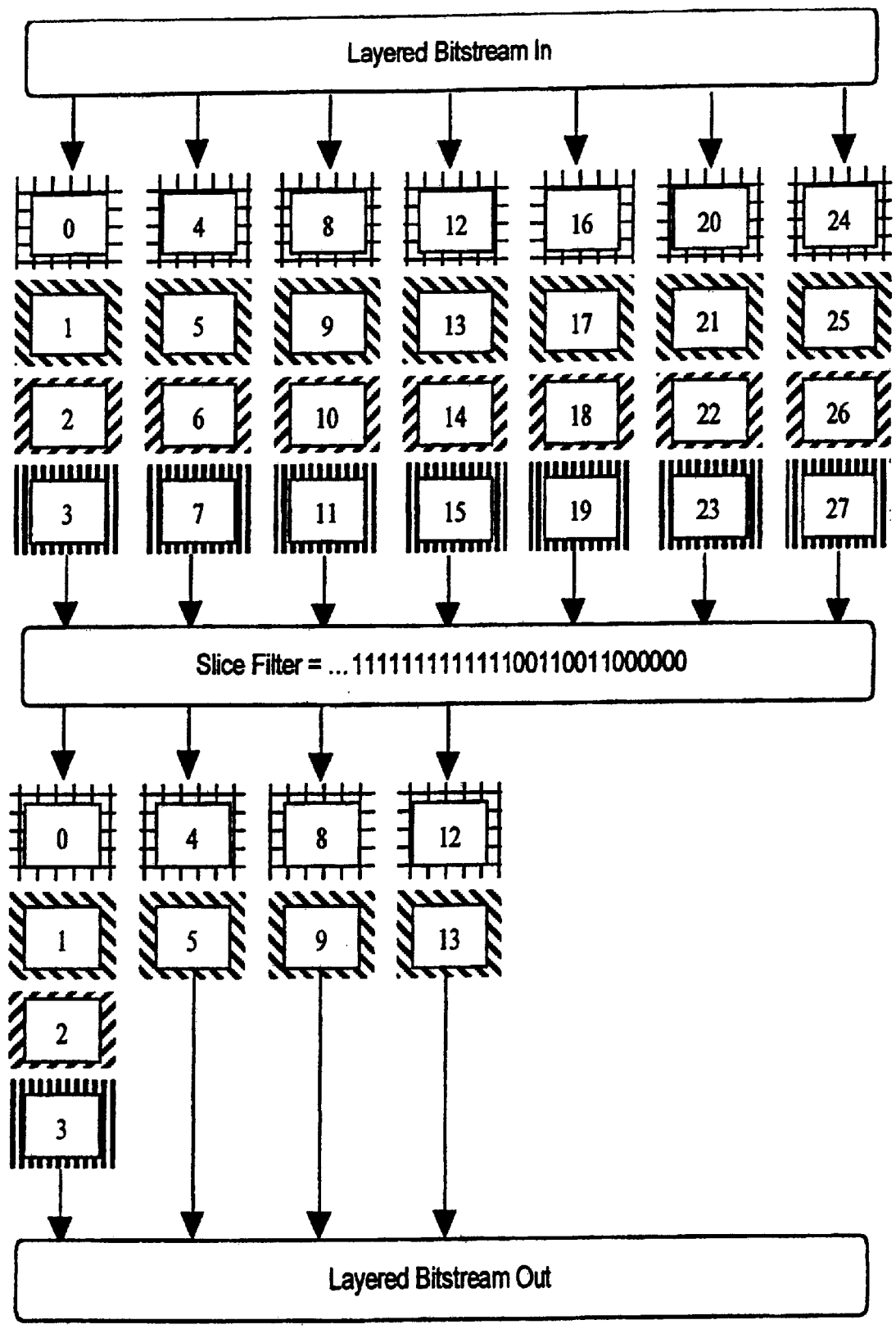
FIG. 7 is a schematic representation of slice filtering as applied to the labelling example of FIG. 5 according to the present invention.

FIG. 5 shows a more detailed example of labelling Wavelet/SPIHT-encoded data. A depth 2 wavelet decomposition with four significance levels results in a Context of 28 slices. A fragment of one possible Codebook for this encoding is shown in FIG. 6 and an example of how the Codebook is used to generate a Filter is illustrated in FIG. 7.

Referring to FIG. 6, the header of the Codebook includes a CodebookID field for self-identification, a QualityTags field that specifies the quality axes available for this encoding, a QualityDivisions field that specifies, using plain-text names, how those axes are labelled, and an OriginalSize field that specifies the spatial resolution of the original media, to provide a baseline for scale calculations.

Each encoding scheme may have its own individual Codebook defined, but any Codebooks that share common QualityTags entries must use exactly the same QualityDivisions scheme to label the quality axes. Textual names are used to map properties of the different media encodings, which may be similar but not identical, into a single quality scheme. This results in an important capability of the system: that an application can be written to manipulate media using these names in a manner that is completely independent of encoding format.

In the Figure it is assumed that a file manipulation tool wishes to extract a medium fidelity, monochrome, half-scale version of a 352 by 288 video encoding. To accomplish this the Codebook is searched (in practice this is optimised using pre-calculated indices) for the highest-numbered label with the required value of QualityParams, i.e., "scale=half, fidelity=medium". Having found this label (13) all the dependent labels are visited until the dependency graph is completely resolved. As this proceeds the bit mask representing the Slice Filter is built: a 'zero' at bit position n indicates that the slice with label (n) is required in the filtered bitstream, a 'one' means that it should be absent. The result of using this filter is illustrated in FIG. 7.

Figure 8:
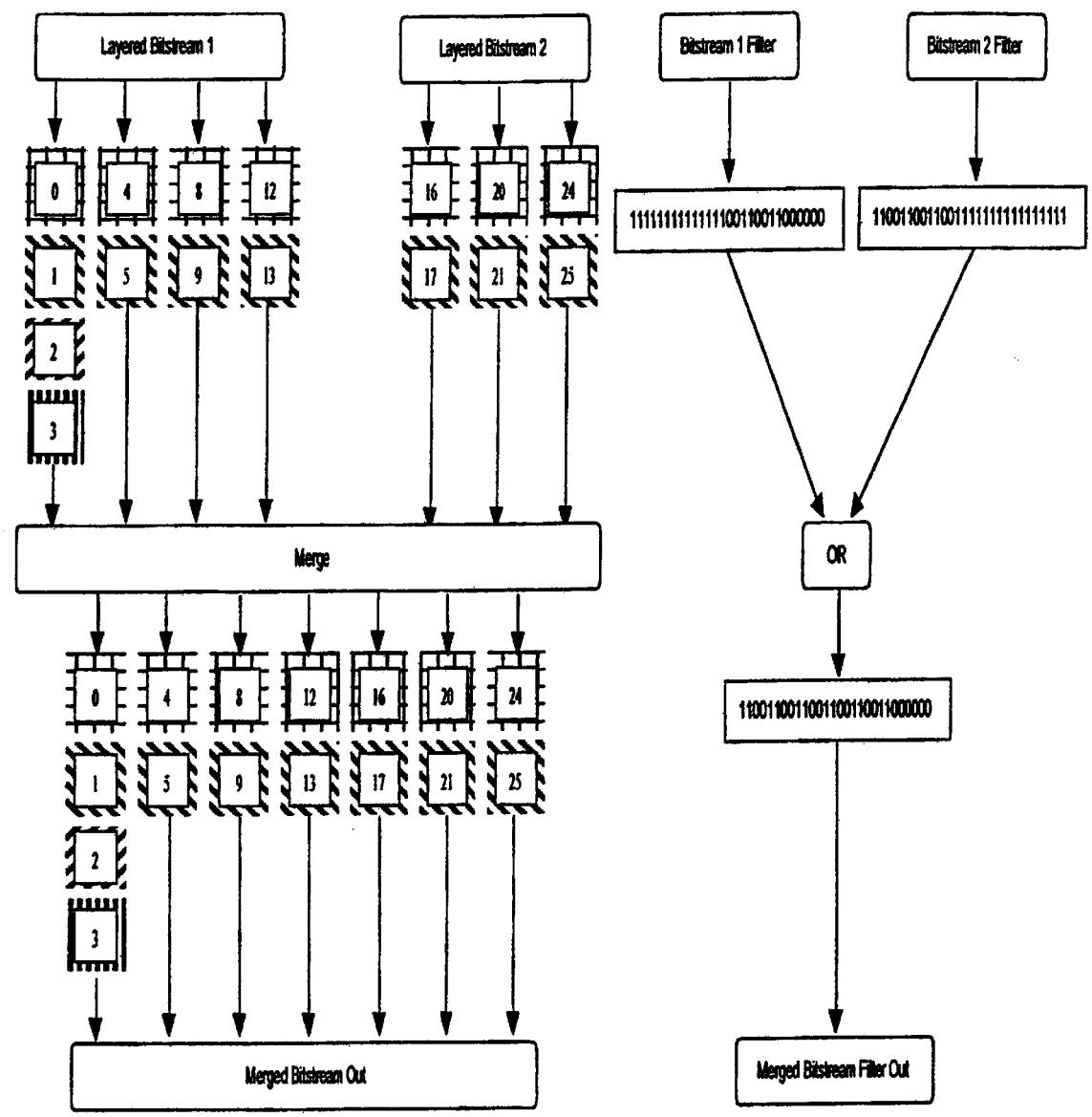
FIG. 8 is a schematic representation of slice merging as applied to the labelling example of FIG. 5 according to the present invention.

Filtered slices are preceded by a Filter Definition signalling chunk which holds the slice mask used to perform the filtering. This value can be used by downstream tools that require knowledge of the stream characteristics, for example, to initialise a decoder, or set up memory areas for buffering. The Slice Mask is also used when filtered bitstreams are merged to determine the slice content of the resulting stream, as illustrated in FIG. 8. Here, a refinement stream containing slices 16, 17, 20, 21, 24 and 25 is merged with the half-scale, low-resolution filtered stream of FIG. 7 to obtain a full-scale, low-resolution encoding. The slice mask for the combined stream is obtained using a simple bitwise OR of the two input Slice Masks.

E. MPEG Example

Figure 9:
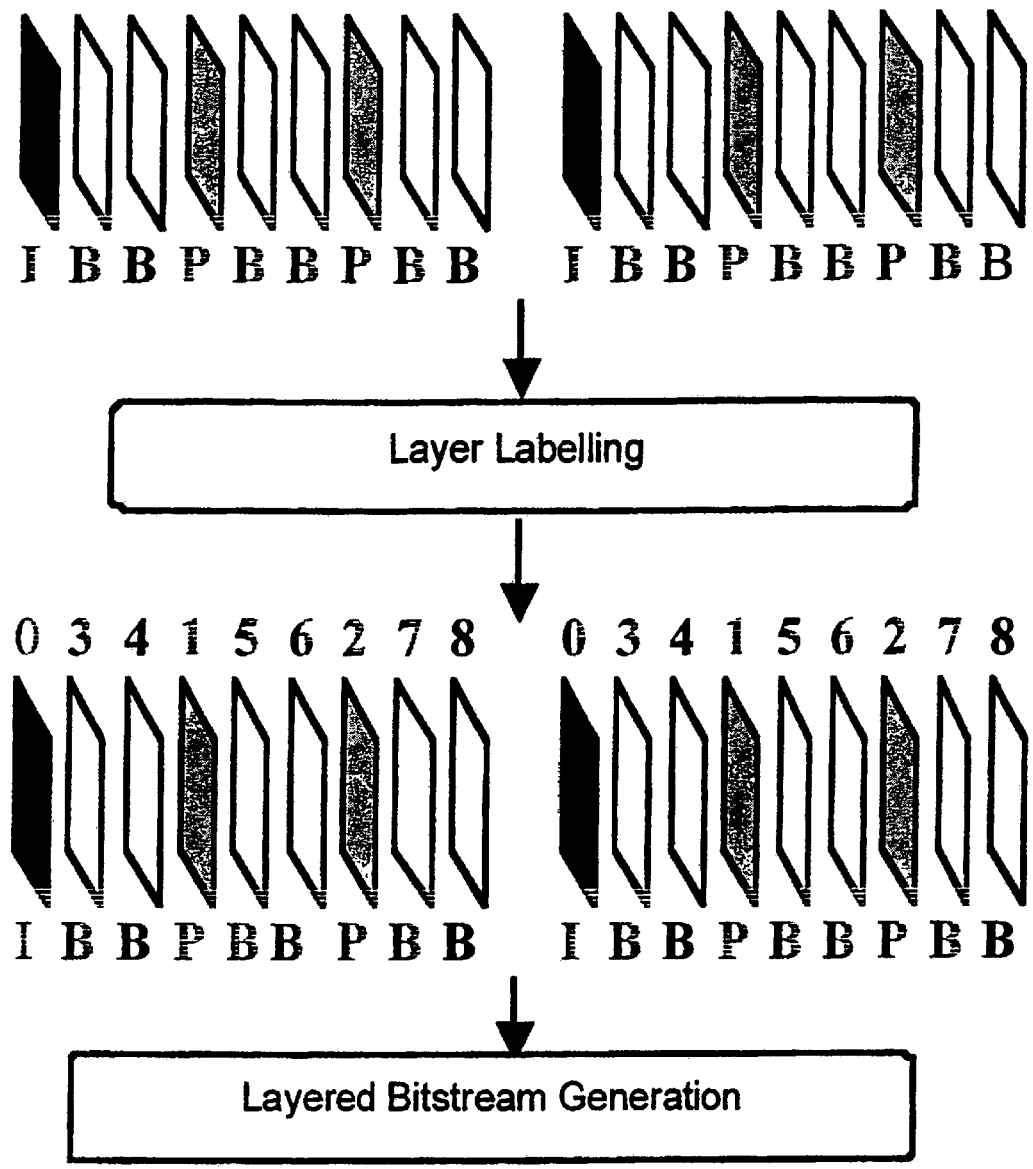
FIG. 9 is a schematic representation of the labelling mechanism as applied to MPEG encoding according to the present invention.
Figure 11:
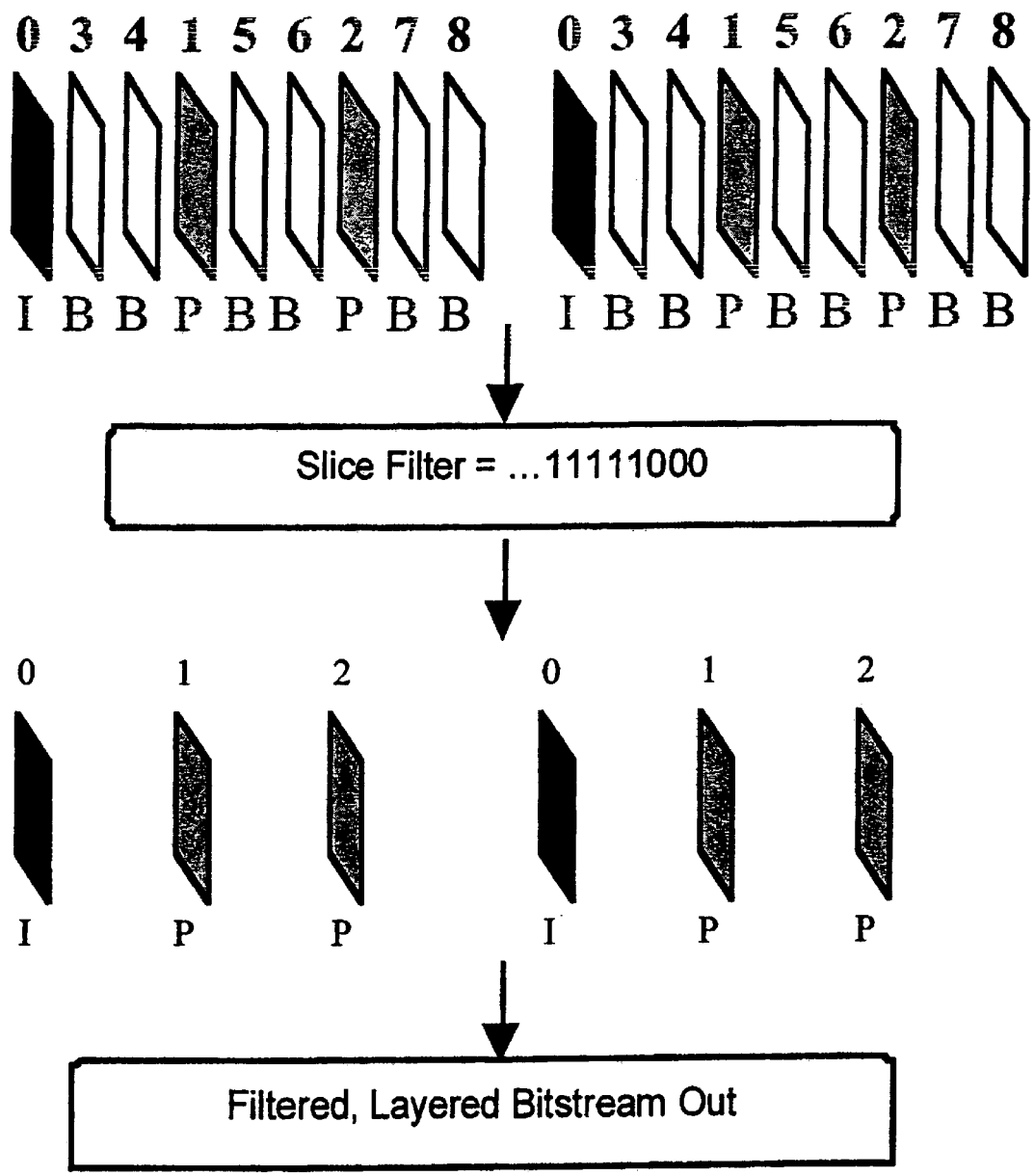
FIG. 11 is a schematic representation of slice filtering as applied to the labelling example of FIG. 9 according to the present invention.

FIG. 9 shows an example of labelling MPEG-encoded data, and FIG. 10 shows a fragment of the corresponding Codebook. In this example it is assumed that a file manipulation tool wants to generate a Filter that operates on slices in such a way as to generate a fast playback stream. In this encoding a Slice represents an MPEG frame, so the effect of the Filter is to decimate the stream temporally. From the Codebook the tool resolves the dependence hierarchy for the QualityParams playrate=fast and builds the Slice Filter as described above. The result of applying the Filter is shown in FIG. 11.

F. DV Example

Figure 12:
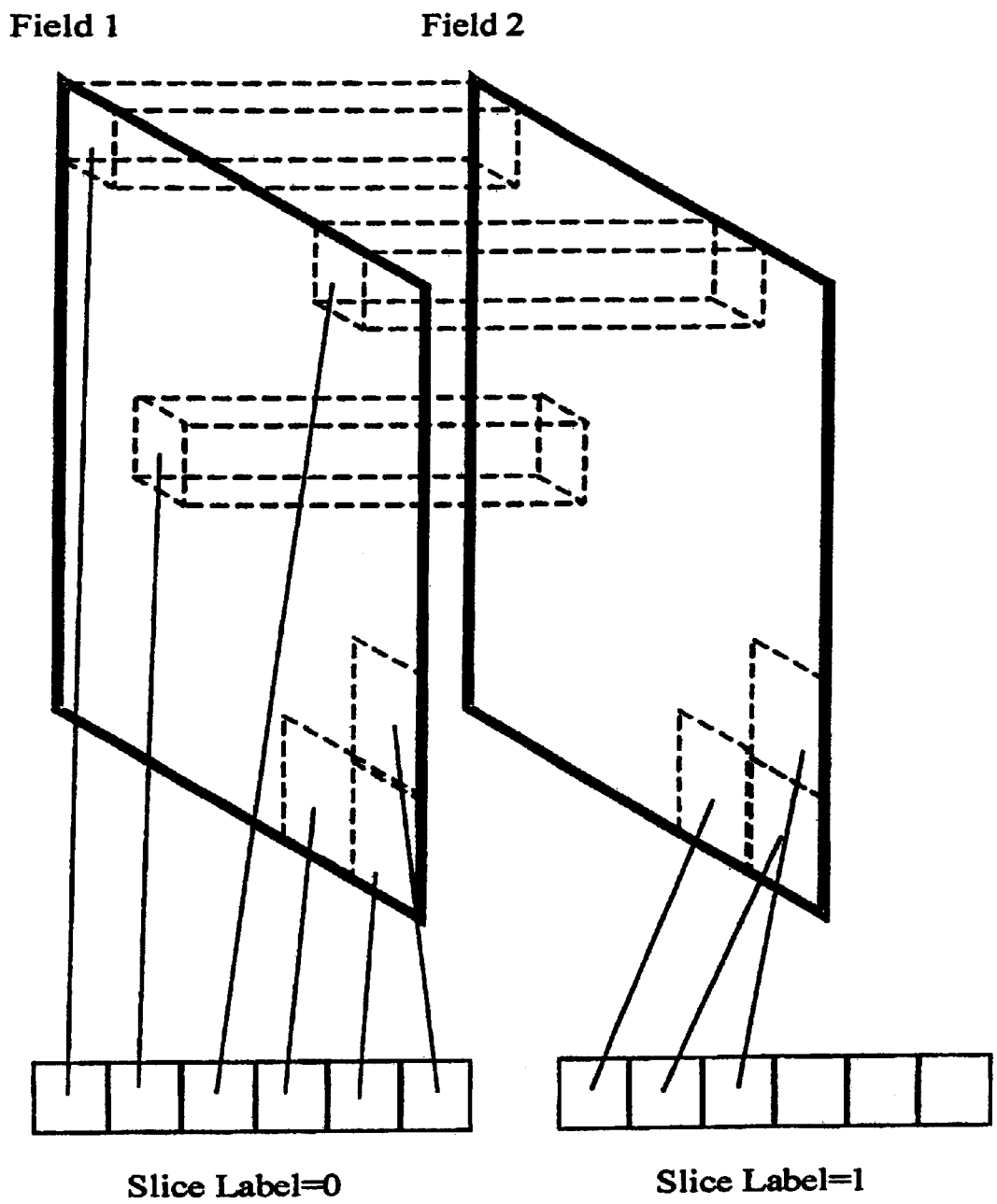
FIG. 12 is a schematic representation of the labelling mechanism as applied to DV encoding according to the present invention.
Figure 14:
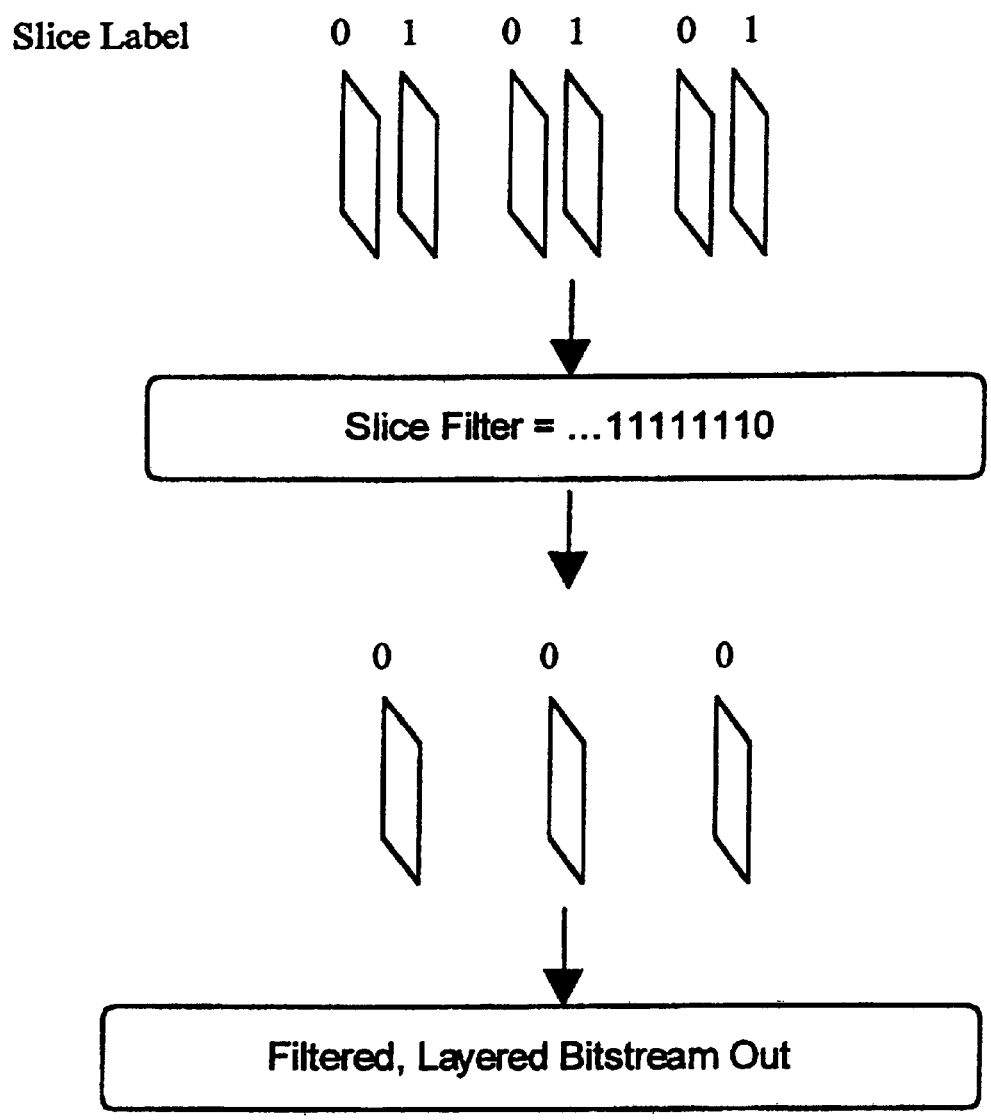
FIG. 14 is a schematic representation of slice filtering as applied to the labelling example of FIG. 12 according to the present invention.
Figure 15:
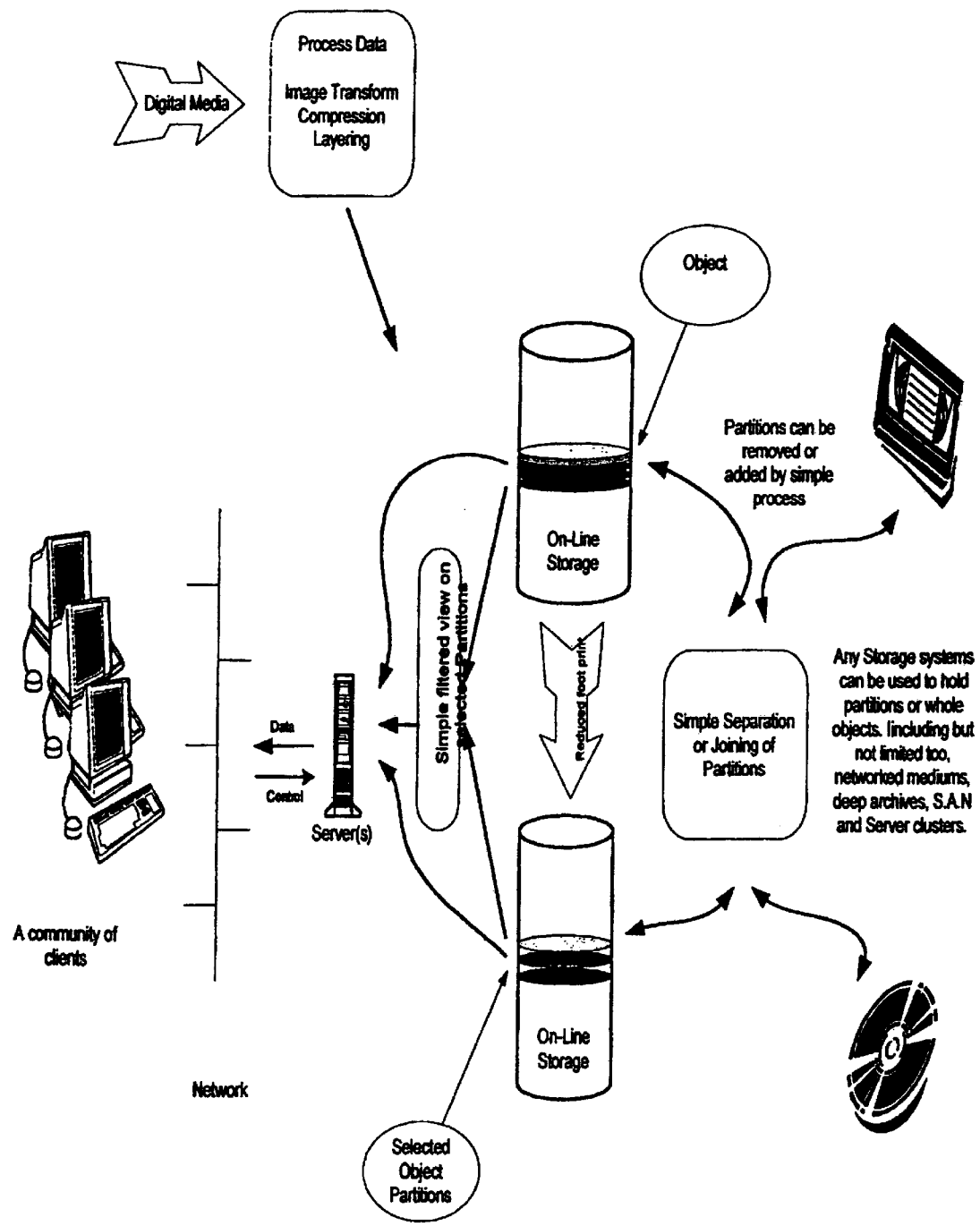
FIG. 15 is a schematic representation of the way digital media can be manipulated according to the present invention.

FIG. 12 shows an example of labelling DV-encoded data, and FIG. 13 shows a fragment of the corresponding Codebook. In this example the DV-encoded data is labelled according to the following scheme: data that represents both 2-by-4-by-8 and 8-by-8 DCT blocks from field 1 are assigned slice label 0; data that represents 8-by-8 DCT blocks only from field 2, are assigned slice label 1. This results in two layers, a base layer with half-vertical resolution derived from field 1, and the refinement layer that produces the full-resolution reconstruction. FIG. 14 illustrates the result of applying a Filter that selects label-0 Slices only, so producing a half vertical resolution video stream. FIG. 15 shows a further example of a system capable of performing the method of the present invention. As media is ingested and provided onto the Server, it becomes immediately available to a community of users. In accordance with operational criteria and by application of a simple reversible splitting function, the on-line footprint may be reduced, moving as much of the data as desirable to alternative storage. Equally, by simple control of a suitable Filter program, a user may select to receive a subset of partitions, without affecting the object.

G. Partitioning

A preferred embodiment of the partitioning aspect of the invention can be explained as follows: A reversible function, called a Splitting Function is applied to a media file $b_0$ such that two new files, called Partitions, $b_1$ and $r_1$ result. $b_1$ is called a Base Partition and is a degraded version of the original $b_0$ which consumes less resource, but which still is a syntactically correct media file which supports all the same operations as the original. In particular, it allows the splitting function to be re-applied. $r_1$ is called a Refinement Partition and represents the information which has been removed from the original during the splitting process. This refinement partition may be migrated to cheaper or off-line storage and subsequently recombined with $b_1$ to reproduce the original media file $b_0$ if required. This is explained slightly more formally as follows:

A Splitting function $S_i(b_{(i-1)})$ is defined where i is the iteration, b is a media file and $b_0$ is the original media file such that:

$$S_1(b_0) \rightarrow b_1, r_1.$$

$$S_2(b_1) \rightarrow b_2, r_2.$$

And in general $$S_n(b_{n-1}) \rightarrow b_n, r_n.$$

After m applications of the splitting function the original media file has been decimated into a set of partitions comprising a single Base Partition $b_m$ and m Refinement Partitions $r_m, r_{m-1}, \ldots, r_1$. The set of refinement partitions is called a Refinement Set.

An inverse Splitting function $S_i'(b_i, r_i)$ is also defined such that $$S_n'(b_n, r_n) \rightarrow b_{n-1}.$$

After m applications of the inverse splitting function to the Base Partition and Refinement Set the original media file $b_0$ is recovered.

There are several points to note. Firstly, it is possible (but not necessary) for each iteration to use a different splitting function with the result that the type and amount of information which is split off, and hence the manner in which the file is degraded, is different each time. At each step the degradation of the media can thus be tailored to meet particular criteria. For example, one step may involve a reduction of the spatial resolution of the media and a subsequent step may retain the spatial resolution but quantise the samples more harshly. This does mean, however, that the splitting function $S_i$ and it's inverse $S_i'$ must be stored as a pair so that the correct inverse splitting function can be used for each step of the reconstruction process.

Secondly, any grade of the media file right up to the original source quality can be recovered by stopping the inverse process at the appropriate step. Thirdly, no information is lost during the splitting process, so as many iterations as required can be used without fear that the original material may become unrecoverable, the only costs being the number of cpu cycles required to process the information from one form into the other, and the overhead involved in moving between different types of data storage.

This scheme allows flexible media management strategies to be implemented in various situations. One example is that of a library of digital media to which shared access is made by a community of users. Typically, each user will work in a different way with the data and have different expectations of it. Some media files may prove more popular than others and be constantly browsed at medium-to-low resolution; in this case the user will expect little or no delay between request and delivery. Other files may be very rarely used but be required to be rendered to the original fidelity when they are needed, in which case the user will tolerate a reasonable delay.

The present scheme addresses these situations and many others. In the first example, the media file is degraded to browse-quality and kept permanently on-line (at least until the usage pattern changes); in the second example only a very low-grade representation is kept on-line as an index to the Refinement Set which is stored permanently off-line.

The most important thing to note here is that the system can have no way of knowing a priori how a particular media file will be used in the future. Such information can only be gathered by monitoring the pattern of usage, so it follows that media files cannot be treated differently during capture and initial encoding. They must be captured and encoded uniformly, then subsequently processed to adapt to their particular roles. To implement this adaptive decimation scheme, the files must either undergo a transformation process at each stage similar in implementation to the way they were first captured and encoded, or, from the start, be structured to support splitting in a straightforward way. The first approach is feasible but is likely to be computationally very expensive, possibly involving a decoding and re-encoding cycle for each forward and inverse step.

The preferred embodiment presented here takes the second approach: to use a layered labeling scheme such as has been described. The advantage is twofold: firstly the splitting is straightforward because the file format explicitely supports this operation; secondly, tools can be designed to implement the scheme that require no knowledge of the original compression format of the files being processed.

Use of the layered labelling scheme to perform splitting as described above is straightforward: the splitting function S is implemented using a Filter (either Slice or Context). The labelling scheme appends a FilterMask to filtered data prior to it being stored (as refinement partitions) so that subsequent recombination of these partitions to recover media files of specified qualities can be achieved by performing simple operations using this mask, as follows.

Suppose an application requires to recover a media file at a particular quality from a refinement set that is distributed over many files in many physical locations, and that has been encoded using the layered labelling scheme described here. The application uses the appropriate Codebook to build a filter representing the desired media quality, as described in section D (Wavelet Example) above. For the present purpose assume the filter is implemented as a simple bitmask. The application then retrieves partitions from storage, one by one, each time 'OR'ing the retrieved FilterMask with those already obtained, and comparing this with the desired filter. When they match, the application knows that it is in possesion of all the data that is required to reconstruct the media file to the desired quality.

H. Application in Edge Server Architecture

An edge server sits between LANs and WANs, moving critical functions such as E-mail, dial-in intranet access, web serving, and security to this interface. The Edge Server can also be seen as a level in a storage hierarchy, caching frequently-accessed data and bringing it closer to the user. Having the media encoded and stored in an archive as a single file, from which, however, multiple qualities may be extracted, means that Base, and low-order refinement partitions can be stored on an Edge Server. This allows efficient, local access by all users to a basic level of media quality, while allowing those users who require better quality to access refinement partitions from remote servers as and when they are needed.

G. Appendix 1

Some Definitions of Terms, as used in the context of the illustrated embodiments Scale A function can be analysed into a set of components with different time/space/frequency content. These components are called scales, and the process of analysis into scales is called multi-scale decomposition. The analysis is performed by a waveform of limited duration and zero integral, called a wavelet. Components that are highly localised in space or time but have an ill-defined frequency spectrum are small-scale and capture fine detail. Components that are spread through space but have a precisely-defined frequency spectrum are large-scale and capture general trends.

Slice

A slice is a labelled encapsulation of a layer, it is the transport mechanism used in the IPV implementation to transport layer information.

Layer

A Layer is a conceptual part of a media file that initialises or refines a single homogeneous component of that file, where that component is data representing spatial resolution, temporal resolution, sample fidelity, colour or any other quality axis.

Base Layer

A layer which is sent first to a client to initialise a representation of a media object at that client, to which refinement layers are added.

Refinement Layer

A Layer which is sent to a client subsequent to a Base Layer and which 'improves' the quality, according to some metric, of the representation of a media object at that client.

Significance Layer
A layer where all the refinement information refers to a particular bit-position for all the coefficients undergoing refinement.

Scale Layer
A layer for which all the refinement information is for a particular scale.

Region Layer
A layer for which all the refinement information is for a particular connected region in a space or time-varying function.

Distortion
The distortion of an image can be measured in terms of it's Peak Signal-to-Noise Ratio (PSNR) where PSNR=10log(255^2/MSE) dB, and MSE is the image's Mean Squared Error.

QualityTags
The set of axes that are available to represent different aspects of perceived quality, for example, spatial resolution, temporal resolution, fidelity of a reconstructed pixel with respect to the original, etc.

QualityDivisions
The marking scheme for the QualityTags axes, for example, the spatial resolution axis may be marked with low, medium, high.

QualityParams
A set of classifiers that can be used to describe the contribution of an item of encoded media to the perceived quality of the reconstruction. A QualityParams classifier is defined by a (QualityTags=QualityDivisions) pair, for example, fidelity=6, or resolution=high.

Codebook
A table that provides an abstraction mechanism such that quality-manipulation operations can be defined on media files that are valid irrespective of their original compression format. The Codebook achieves format-independence through use of the QualityParams classification system.

Filter
An information structure that defines a partitioning of a layered media file into two parts; one part representing the media file at a reduced quality, and the other representing the enhancement information needed to reconstruct the original file. The simplest implementation is a bitmask where 'zero' and 'one' at bit positions n specifies whether a data item with a particular label (n) is or is not required in the lower-quality output file.

Filter Mask
A piece of information that is appended to a filtered file in order to inform downstream tools about the information content of the file (i.e, what has been filtered out of it). If the filter is implemented as a simple bitmask then the filter mask can simply be a copy of this filter.

Digital Media
In the context of this document this refers to a piece of media sampled into the digital domain and represented by a data, this term can relate to Video, Audio or Still image.

S.A.N
Storage Area Network; for example, a network of physical devices provided as a logical and virtual pool of integrated, secure, multi-user storage.

Partition
The description given to files resulting from the application of a splitting function to an input file. One partition (the Base Partition) represents the input file at a reduced quality, and the other (the Refinement Partition) represents the enhancement information needed to reconstruct the input file. The input file is either the original, fill-quality layered media file, or a Base Partition derived from it.

What is claimed is:

1. A method of storing digital data comprising the steps of:
(a) providing a media object at a given quality level;
(b) providing a reversible function, the reversible function comprising a splitting function capable of iterative application, and an inverse splitting function capable of iterative application;
(c) manipulating the media object, using the splitting function of the reversible function, into a first data part, from which a first quality version of the media object can be re-generated, the first data part being stored on a first storage medium which is accessible on-line, and a second data part, the second data part being re-combinable with the first data part using the inverse splitting function of the reversible function to enable a version of the media object to be regenerated which is of higher quality than the quality of the version of the media object which could be re-generated using only the first data part;
(d) transferring the second data part to a second storage medium which is near on-line accessible and which is physically separate from the first storage medium; and
(e) storing the reversible function on the second storage medium.

2. The method of claim 1 where:
the media object is a layered file with the property that it can be reconstructed to meet specified quality criteria, this property being independent of the choice of original compression format;
the layers sit in a dependency hierarchy and groups of these layers are related by dependency;
the layers are identified by unique labels such that all layers have a numerically lower label value than those that depend on them; and,
the quality criteria include one or more of the following: scale, fidelity, color, temporal blur.

3. The method of claim 1 in which the reversible function can generate the first and second data parts in dependence on one or more criteria.

4. The method of claim 3 in which the criteria include the following:
(i) the time elapsed since the creation of the media object or the first data part;
(ii) metadata associated with an original from which the media object is derived;
(iii) usage patterns;
(iv) the availability of either on-line and/or lower cost storage;
(v) flags set by a user to denote content of interest.

5. The method of claim 1 in which the second storage medium is an archival medium.

6. The method of claim 1 in which the second storage medium can be accessed in order to transfer back to a processing unit the second data part to enable the re-generation of a version of the media object of quality higher than that obtainable from the first part.

7. The method of claim 6 in which the transfer back occurs automatically on the request of a user.

8. The method of claim 1 in which the reversible function can address different aspects of quality, including bit depth, size and frame rate.

9. The method of claim 1 in which the first quality version is of a lower quality than the second quality version.

10. The method of claim 9 in which a user can preview the first, lower quality version associated with the first data part before accepting that manipulation.

11. The method of claim 1 in which the media object is in a format which allows the step of manipulation to occur without additional processing to alter the file format of the media object.

12. The method of claim 11 in which the media object is generated using layered labeling.

13. The method of claim 12 in which the second data part is refinement layer information which, when combined with the first data part, allows the original media object to be regenerated.

14. A method of recovering a media object which has been stored using the method of claim 1, comprising the step of re-combining the first data part and the second data part using the reverse of the function.

15. Digital data stored using the storage method of claim 1.

16. A computer program which, when running on a client, enables the client to receive and playback a media object previously stored using the method of claim 1.

17. A computer program which when running on a computer enables the computer to perform the method of claim 1.

18. A computer programmed to perform the method of claim 1.

19. A computer network comprising several computers, at least one of which performs the data storage method of claim 1 and enables users to access the different versions of the media object.

* * * * *